United States Patent [19]

Knoblauch et al.

[11] 4,415,340
[45] Nov. 15, 1983

[54] ADSORPTIVE SEPARATION OF GASES

[75] Inventors: Karl Knoblauch; Heinrich Heimbach, both of Essen, Fed. Rep. of Germany

[73] Assignee: Bergwerksverband GmbH, Essen, Fed. Rep. of Germany

[21] Appl. No.: 367,971

[22] Filed: Apr. 13, 1982

Related U.S. Application Data

[63] Continuation of Ser. No. 166,096, Jul. 3, 1980, abandoned.

[30] Foreign Application Priority Data

Aug. 9, 1979 [DE] Fed. Rep. of Germany ....... 2932333

[51] Int. Cl.$^3$ ............................................. B01D 53/04
[52] U.S. Cl. .......................................... 55/25; 55/58; 55/68; 55/75
[58] Field of Search ..................... 55/25, 58, 68, 74, 75

[56] References Cited

U.S. PATENT DOCUMENTS

| | | | |
|---|---|---|---|
| 3,085,379 | 4/1963 | Kiyonaga et al. | 55/58 X |
| 3,149,934 | 9/1964 | Martin | 55/58 |
| 3,155,468 | 11/1964 | de Montgareuil et al. | 55/25 |
| 3,237,377 | 3/1966 | Starstrom | 55/58 X |
| 3,473,296 | 10/1969 | Tamura | 55/75 |
| 3,638,398 | 2/1972 | Domine et al. | 55/25 |
| 3,801,513 | 4/1974 | Munzner et al. | 55/75 X |
| 4,015,956 | 4/1977 | Munzner et al. | 55/58 X |
| 4,104,039 | 8/1978 | Kuri et al. | 55/25 X |
| 4,144,037 | 3/1979 | Armond et al. | 55/58 |
| 4,222,750 | 9/1980 | Gauthier et al. | 55/58 |
| 4,264,339 | 4/1981 | Juntgen et al. | 55/58 X |

FOREIGN PATENT DOCUMENTS 1480866 7/1977 United Kingdom ................. 55/58

Primary Examiner—Robert H. Spitzer
Attorney, Agent, or Firm—Michael J. Striker

[57] ABSTRACT

Nitrogen is separated from oxygen in air by passing the air through a vessel containing carbonaceous molecular sieve until the sieve has adsorbed a predetermined proportion of oxygen. The vessel is then connected to and pressure-equalized with a similar but desorbed vessel and thereupon the connection is broken and the stream of air switched to the second similar vessel. During the first 1–10 seconds during which the product (N$_2$) gas issues from the second vessel, this stream is diverted since it contains an unusually high oxygen ratio, and either discharged or recirculated to the incoming air. Thereafter the stream of product gas is collected for further use.

7 Claims, 1 Drawing Figure

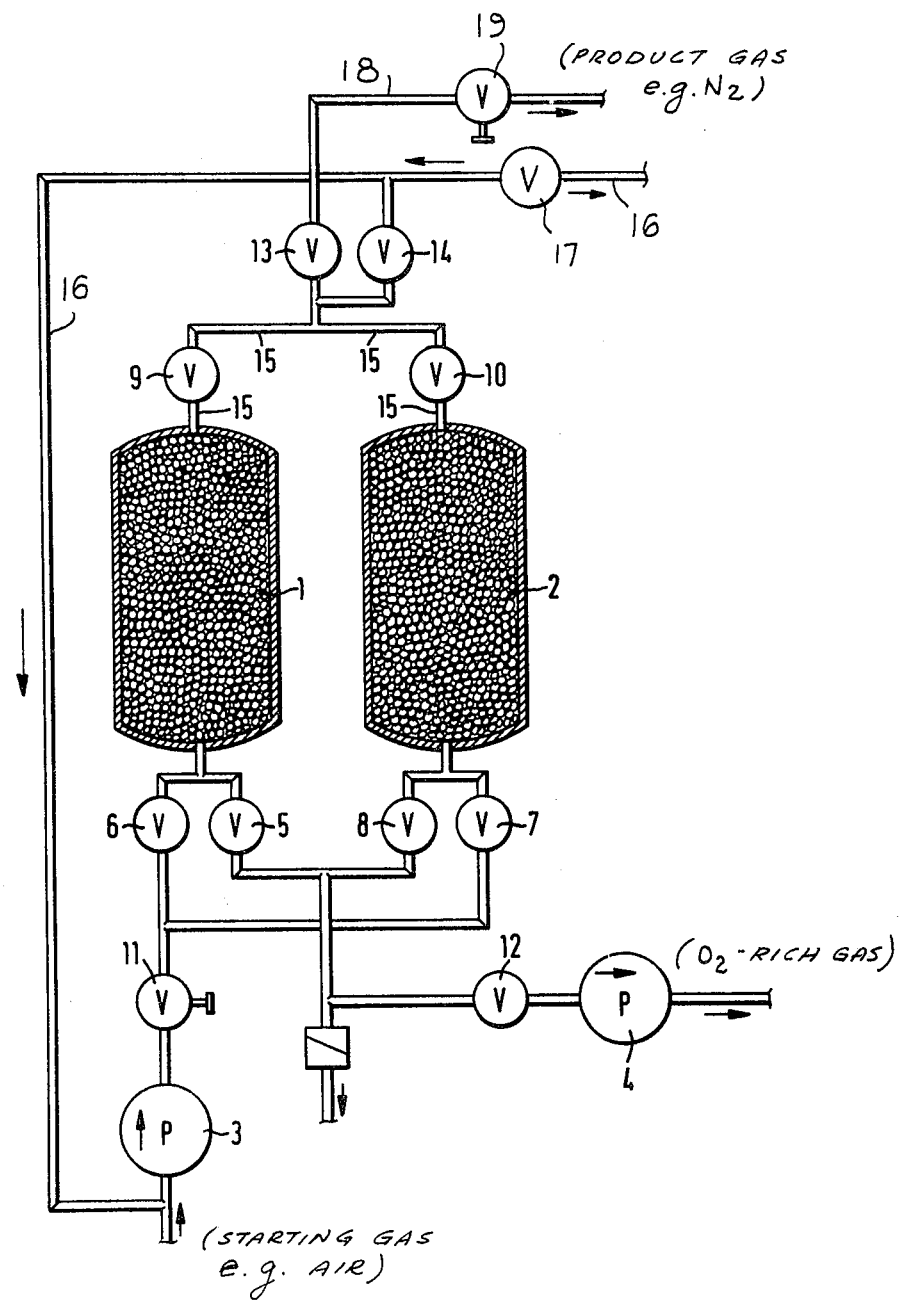

ADSORPTIVE SEPARATION OF GASES

This is a continuation of application Ser. No. 166,096, filed July 3, 1980, now abandoned.

BACKGROUND OF THE INVENTION

1. Field of the Invention

The present invention relates to the adsorptive separation of gases.

More particularly, the invention relates to a method of separating nitrogen by adsorption from a gas mixture which contains, in addition to the nitrogen component, at least oxygen as another component.

Still more specifically, the invention relates to a method of effecting the aforementioned separation by alternative adsorption and desorption of carbonaceous molecular-sieve coke.

2. The Prior Art

The basic principle of effecting gas separation by adsorption is known. To obtain a nitrogen-rich product gas it is customary to pass a gas mixture through a body of molecular-sieve coke in a reactor vessel or adsorber until the product gas issuing from the body is found to contain an undesirably high oxygen contant of, e.g., 4%. This is indicative of the fact that the molecular-sieve coke has adsorbed oxygen to the limit of its capacity and must now be desorbed before it is able to perform further useful work. Consequently, when a rise of the oxygen content in the product gas beyond a certain threshold value is detected, the stream of gas mixture—usually air—is diverted to a second reactor vessel containing another body of molecular-sieve coke which has been previously desorbed, as by, e.g., evacuation of the vessel. The previous separation procedure is now repeated in the second vessel and during the time the molecular-sieve coke—hereafter called "adsorbent" for convenience—of the first vessel is desorbed.

The separation phase during which the adsorption takes place, is generally effected at a pressure of about 1–10 bar; the flow of starting gas (i.e., of the incoming gas mixture) through the adsorber may take place at constant pressure or at steadily increasing pressure. The subsequent desorption is effected by pressure reduction in the adsorber down to 1 bar or to below 100 Torr. The product gas may during the separation phase be vented from the adsorber as soon as the separation begins or else such venting may be delayed until pressure in the adsorber rises to between 3–20 bar, preferably to 4–10 bar. Venting of the product gas then starts only when the preselected pressure level is reached; once venting begins the pressure level may be maintained or it may be reduced.

It has been found to be advantageous to effect a pressure equalization between the two adsorbers at their inlets and outlets before the stream of starting gas is switched to the newly-desorbed adsorber; when this is completed, the stream of starting gas is then made to pass through the desorbed adsorber and the previously used fully loaded adsorber is now in turn desorbed.

In connection with this procedure, however, a problem has been observed which has heretofore defied a solution. It is found that when starting gas passes through the newly desorbed adsorber, the product gas which is initially obtained is not nitrogen of the expected purity—but nitrogen which has a slightly elevated oxygen content of, e.g., about 0.25 vol/%. The expected degree of purity, e.g., about 0.1 vol/% of oxygen in the product gas, is reached only after the product gas has been issuing from the adsorber for a period of about 10 seconds. But this oxygen differential, while perhaps fairly slight when considered overall, has heretofore stood in the way of all efforts to obtain a product gas having the low average oxygen content which it should be theoretically possible to achieve.

SUMMARY OF THE INVENTION

It is, therefore, an object of the present invention to overcome the disadvantages of the prior art.

A more particular object is to provide an improved method of separating nitrogen from one or more other gases by adsorption and to reduce the average oxygen content in the resulting product gas below the levels heretofore achievable.

Pursuant to these objects, and to still others which will become apparent thereafter, one aspect of the invention resides in a process of adsorptively separating nitrogen from a gas mixture composed of at least nitrogen and oxygen by alternatingly adsorbing and desorbing oxygen on molecular-sieves contained in at least two vessels, comprising the first step of passing a stream of the gas mixture through a previously desorbed one of the vessels so that a stream of product gas consisting essentially of nitrogen issues from an outlet of the vessel; the second step of terminating the passage of the stream when the molecular-sieves in the one vessel have adsorbed oxygen to a predetermined extent; the third step of connecting the inlet and outlet of the one vessel with the inlet and outlet of the other desorbed vessel, so as to pressure-equalize the vessels; the fourth step of disconnecting the vessels from one another; the fifth step of passing a stream of the gas mixture through the other vessel so that a stream of the product gas begins to issue from the outlet of the other vessel; and the sixth step of diverting the stream of product gas from its normal path during a predetermined brief period following the initiation of its flow from the outlet to the other vessel.

The problems of the prior art, heretofore well recognized but not understood as to their significance, result from the pressure-equalization which is effected between the two alternatingly on-stream adsorbers. As the pressure-equalization is carried out oxygen, which is still contained in the adsorber having the spent adsorbent but which could not be adsorbed any more, enters the previously desorbed adsorber and the various conduits leading into and out of the same. Since no adsorption takes place in these conduits, the product gas (e.g., nitrogen) which begins to flow as the desorbed adsorber comes back on stream, pushes the oxygen ahead of it so that it becomes a part of the product gas yield. The invention precludes this by diverting the product gas run for the initial 1–10 seconds—preferably about 2–5 seconds—during which the entrapped oxygen is being expelled. As a result, the invention makes it possible to avoid the heretofore inexplicable $O_2$ increase in the product gas and to reduce the average $O_2$ content in the product gas to or near to the theoretically achievable level.

The thus diverted oxygen-rich product gas fraction may be simply vented to the atmosphere, or according to a further embodiment of the invention it may be recirculated to the incoming gas mixture (e.g., air) since it evidently constitutes an advantageous starting gas for the production of nitrogen.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE INVENTION

The single FIGURE illustrates an exemplary apparatus for carrying out the method according to the invention.

DESCRIPTION OF PREFERRED EMBODIMENTS

The illustrated apparatus utilizes two adsorber vessels 1,2 each of which is filled with, e.g., 10 m$^3$ of molecular-sieve coke (known per se). It operates continuously, in that one of the vessels 1,2 is always on stream while the other one is being desorbed, and vice versa.

The lower inlet ends of the vessels 1,2 are directly connected with one another by a line in which valves 5 and 8 are interposed; a similar connection exists at the upper (outlet) ends via valves 9 and 10. Product gas, e.g., nitrogen, is discharged from the outlet ends of the vessels via valves 9,10, line 15, valve 13, line 18 and valve 19.

The starting gas mixture, e.g., air as shown, is aspirated by blower 3 and forwarded via valves 11, 6 and 7 into the adsorber 1,2. The gas resulting from desorption (i.e., in the instant example a gas containing a higher proportion of oxygen than the starting gas) is discharged from adsorber 1 via valve 5 and from adsorber 2 via valve 8, in either case with the aid of suction produced by a vacuum pump and through another valve 12.

Let it be assumed that the apparatus is already in operation and that the adsorber vessel 1 has just been desorbed whereas the molecular-sieve coke in vessel 2 is fully laden and requires regeneration (i.e., the vessel 2 must be desorbed). For this purpose, the valves 7 and 13 are closed and the valves 8 and 9 are opened; valves 5 and 10 are still open and valves 6 and 14 remain closed. Gas can now flow from the adsorber 2, which has been taken off stream by closing of the valve 7, into the adsorber 1 until the pressure between them is equalized; this requires a time of about 1-3 seconds and the gas entering adsorber 1 contains residual oxygen which could not be adsorbed any more in the vessel 2. This oxygen-containing gas is now present at the outlet end of adsorber vessel 1 and in the line 15 intermediate the valves 9, 10, 13 and 14.

Now the adsorber 1 is placed on stream by closing valves 5 and 10 and opening valve 6 so that the blower 3 can blow air (composition: 21% $O_2$, 450 ppm $CO_2$, dewpoint 16° C.) into the adsorber 1; for the first 3-10 seconds after the adsorber 1 is placed on stream, the valves 13 and 14 are opened so that the residual oxygen-containing gas which has entered from adsorber 2 can be expelled from the outlet end of adsorber 1 and from the line 15 by the nitrogen which advances through the adsorber 1 from the inlet end of the same. After expiration of the 3-10 second time period the valve 14 is closed and $N_2$ product gas now issues from adsorber 1 via valves 9, 13, line 18 and valve 19.

At the same time as the adsorber vessel 1 is placed on stream desorption of the vessel 2 is begun. For this purpose, the valve 8 is opened and vacuum pump 4 evacuates the vessel 2 via valve 12 over a period of about 57 to 59 seconds down to a partial vacuum of about 50 mbar; the super-oxygenated gas withdrawn by the pump 4 can be discharged to the atmosphere.

As soon as the adsorber 1 is fully charged, i.e., when the level of $O_2$ in the product gas reaches the threshold value, it is taken off stream and adsorber 2 is placed back on stream. Before doing so, however, pressure is equalized between the adsorbers 1,2 via the valves 5, 8 and 9 and 10; i.e., as soon as absorber 1 is taken off stream, gas is allowed to flow from it to the inlet end and to the outlet end of adsorber 2 until pressure equalization has been achieved. Subsequently, starting gas (e.g., air) is blown by blower 3 via valves 11 and 7 into adsorber 2, during the first 3-10 seconds of this the valve 13 is closed and valves 10 and 14 are open to discharge the oxygen-containing gas (which has entered adsorber 2 from adsorber 1) to the atmosphere via line 16. Thereupon the valve 14 is closed and valve 13 opened to collect the product gas.

Should it be desired to recirculate the initial oxygen-containing gas fraction into the starting gas, rather than to discharge it to the atmosphere, then it is merely necessary to close valve 17 when opening the valve 14; since the line 16 communicates at its distal end with the intake of the blower 3, the gas fraction is drawn into and becomes admitted into the incoming starting gas.

While the invention has been illustrated and described as embodied in a method of separating nitrogen from oxygen, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a process of adsorptively separating nitrogen from a gas mixture composed of at least nitrogen and oxygen by alternatingly adsorbing and desorbing oxygen on molecular-sieve coke contained in at least two vessels, of the type in which a stream of gas mixture is passed through a previously desorbed one of the vessels so that a stream of product gas consisting essentially of nitrogen issues from an outlet of said one vessel; the passage of the stream is terminated when the molecular-sieve coke in the one vessel has adsorbed oxygen to a predetermined extent; the inlet and outlet of said one vessel are connected with the inlet and outlet of the other desorbed vessel, so as to pressure-equalize said vessels; said vessels are disconnected from one another; and a stream of the gas mixture is passed through said other vessel so that a stream of the product gas begins to issue from the outlet of the other vessel, the improvement comprising diverting the stream of product gas from its normal path during a predetermined brief period starting at the initiation of its flow from said outlet of said other vessel so that an initial part of the product gas which contains an oxygen peak is not used, and thereafter a following part of the product gas which no longer contains the oxygen peak flows in its normal path to be used.

2. A process as defined in claim 1; repeating the second through sixth steps; and in the repeated sixth step diverting for said period the stream of product gas flowing from the outlet of said one vessel.

3. A process as defined in claim 1; and desorbing said one vessel while said stream of gas mixture passes through said other vessel.

4. A process as defined in claim 1; wherein said sixth step has a duration of about 1-10 seconds.

5. A process as defined in claim 1; wherein said sixth step has a duration of about 2-5 seconds.

6. A process as defined in claim 1; and further comprising the step of venting the diverted product gas stream to the ambient atmosphere.

7. A process as defined in claim 1; and further comprising the step of recirculating the diverted product gas stream to and mixing it with, said gas mixture.

* * * * *